U S008620369B2

(12) United States Patent  
Hwang et al.

(10) Patent No.: US 8,620,369 B2  
(45) Date of Patent: Dec. 31, 2013

(54) CHANNEL ACCESS METHOD IN WIRELESS NETWORK

(75) Inventors: Sung Ho Hwang, Gyunggi-do (KR); Ki Hong Kim, Gyunggi-do (KR); Jun Ki Min, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 188 days.

(21) Appl. No.: 13/233,720

(22) Filed: Sep. 15, 2011

(65) Prior Publication Data

US 2012/0088536 A1  Apr. 12, 2012

(30) Foreign Application Priority Data

Oct. 11, 2010 (KR) .................. 10-2010-0098780

(51) Int. Cl.  
*H04B 7/00* (2006.01)

(52) U.S. Cl.  
USPC ............ 455/515; 455/434; 455/516; 455/512

(58) Field of Classification Search  
USPC .............. 455/515, 434, 67.11, 512, 516, 455; 370/445, 465, 338  
See application file for complete search history.

(56) References Cited

U.S. PATENT DOCUMENTS

| 7,701,961 | B2 * | 4/2010 | Lim et al. ............... 370/445 |
| 2002/0163933 | A1 * | 11/2002 | Benveniste ............ 370/465 |
| 2005/0271019 | A1 * | 12/2005 | Yuan et al. ............ 370/338 |

FOREIGN PATENT DOCUMENTS

KR   10-2009-0128067   12/2009

* cited by examiner

*Primary Examiner* — John J Lee  
(74) *Attorney, Agent, or Firm* — McDermott Will & Emery LLP

(57) ABSTRACT

There is provided a channel access method in which a channel access method in a wireless network in which a channel access opportunity is provided to high priority traffic for each super-frame. The channel access method includes: setting parameter values required for channel access; setting a channel access time to be equal to a size of a contention access period (CAP); and accessing a channel to be used by resetting the channel access time to be equal to the size of the CAP when traffic to be transmitted is traffic having a preset high priority in a case in which the channel is not in an idle state.

8 Claims, 2 Drawing Sheets

CHANNEL ACCESS METHOD IN WIRELESS NETWORK

CROSS-REFERENCE TO RELATED APPLICATIONS

This application claims the priority of Korean Patent Application No. 10-2010-0098780 filed on Oct. 11, 2010, in the Korean Intellectual Property Office, the disclosure of which is incorporated herein by reference.

BACKGROUND OF THE INVENTION

1. Field of the Invention

The present invention relates to a channel access method in a wireless network, and more particularly, to a channel access method in a wireless network in which a channel access opportunity is provided to high priority traffic for each super-frame.

2. Description of the Related Art

Recently, a wireless network has been widely used due to ease of communications, data transmission, or the like, between objects.

In particular, a wireless network according to the IEEE 802.15.4 standard, having low power characteristics while satisfying low speed data transmission characteristics, or a wireless network using Zigbee has been widely used.

Meanwhile, in accordance with an increase in general societal interest in saving energy, a smart grid technology has been prominent. A smart grid, an intelligent power network in which an information-communication technology is grafted onto an existing power network, is a technology for maximizing energy efficiency through a real-time bi-directional information exchange between a power supplier and a power consumer. To this end, a wireless network device such as a smart utility network (SUN) according to the IEEE 802.15.4e standard or a wireless network device using Zigbee has been widely used.

In a frame structure in the IEEE 802.15.4e standard or the IEEE 802.15.4 standard, a time between two continuous beacons may be divided into an active period and an inactive period, and the active period may be again divided into a contention access period (CAP) in which transmission requests are contested and a contention free period (CFP) in which data is transmitted.

As described above, in the case of the channel access method according to the related art, terminals gaining access to the CAP gain the access regardless of traffic priority, such that the transmission of high priority traffic may be delayed.

SUMMARY OF THE INVENTION

An aspect of the present invention provides a channel access method in a wireless network in which a channel access opportunity is provided to high priority traffic for each super-frame.

According to an aspect of the present invention, there is provided a channel access method in a wireless network, the channel access method including: setting parameter values required for channel access; setting a channel access time to be equal to a size of a contention access period (CAP); and accessing a channel to be used by resetting the channel access time to be equal to the size of the CAP when traffic to be transmitted is traffic having a preset high priority in a case in which the channel is not in an idle state.

The setting of the parameter values may include setting number backoff (NB), contention window length (CW), and backoff exponent (BE) parameter values.

The accessing of the channel may include: accessing the channel according to the set channel access time; resetting the NB, CW, and BE parameter values in a case in which the accessed channel is not in the idle state; and resetting the channel access time to be equal to the size of the CAP when the traffic to be transmitted is the traffic having a preset high priority.

The accessing of the channel may further include attempting access to the channel to be used by resetting the channel access time to be equal to the size of the CAP until the reset NB parameter value is the same as the maximum number of backoffs.

The channel access method may further include decreasing the CW parameter value by '1' in the case in which the accessed channel is in the idle state and transmitting the traffic to a corresponding channel when the CW parameter value becomes '0'.

The accessing of the channel may further include resetting the channel access time to be equal to a size of $2^{BE}$ when the traffic to be transmitted is not the traffic having a preset high priority.

The accessing of the channel may further include attempting access to the channel to be used by resetting the channel access time to be equal to the size of $2^{BE}$ until the reset NB parameter value is the same as the maximum number of backoffs.

According to another aspect of the present invention, there is provided a channel access method in a wireless network, the channel access method comprising: setting number backoff (NB), contention window length (CW), and backoff exponent (BE) parameter values required for channel access; setting a channel access time to be equal to a size of a contention access period (CAP); accessing a channel according to the set channel access time; resetting the NB, CW, and BE parameter values in a case in which the accessed channel is not in an idle state; attempting access to a channel to be used by resetting the channel access time to be equal to the size of the CAP until the reset NB parameter value is the same as the maximum number of backoffs when traffic to be transmitted is traffic having high priority; decreasing the CW parameter value by '1' in a case in which the channel to be used is in the idle state and transmitting the traffic to a corresponding channel when the CW parameter value becomes '0'; resetting the channel access time to a size of $2^{BE}$ when the traffic to be transmitted is not traffic having high priority; and attempting the access to the channel to be used by resetting the channel access time to be equal to the size of $2^{BE}$ until the reset NB parameter value is the same as the maximum number of backoffs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings.

Figure 1:
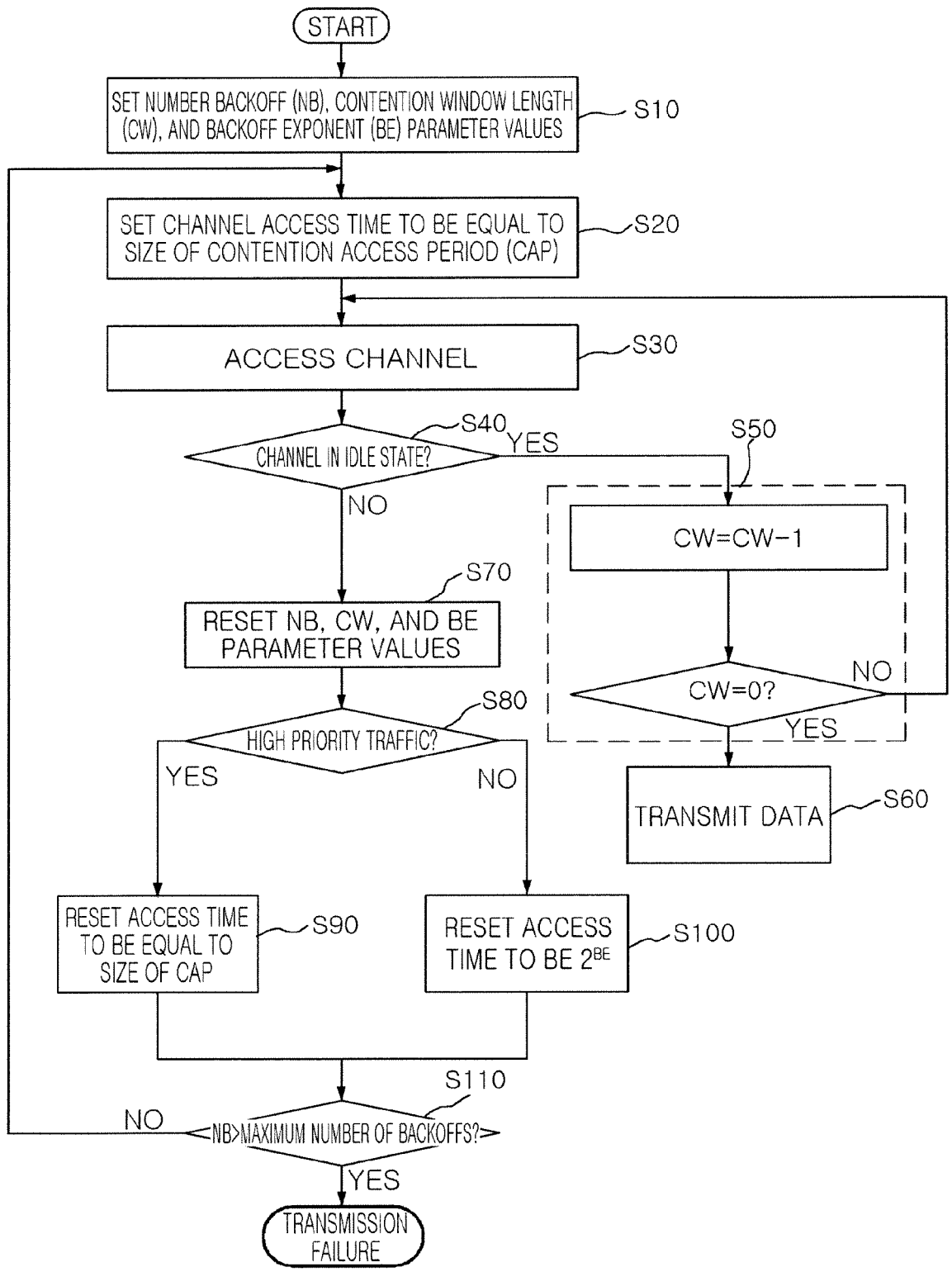
FIG. 1 is an operation flow chart showing a channel access method according to an embodiment of the present invention.

FIG. 1 is an operation flow chart showing a channel access method according to an embodiment of the present invention.

Referring to FIG. 1, a channel access method according to an embodiment of the present invention may include setting parameter values required for channel access (S10), setting a channel access time to be equal to a size of a contention access period (CAP) (S20), and accessing a channel to be used by resetting the channel access time to be equal to the size of the CAP when traffic to be transmitted is traffic having a preset high priority according to a state of the channel (S30, S40, S70, S80, and S90).

First, in the operation (S10) of setting the parameter values, the values of parameters required for channel access are set. More specifically, number backoff (NB), contention window length (CW), and backoff exponent (BE) parameter values may be set. Here, the NB parameter value indicates the number of backoff attempts performed while a terminal attempts data transmission according to a carrier sense multiple access with collision avoidance (CSMA/CA) algorithm in a wireless network, the CW parameter value indicates a counter value for clear channel assessment (CCA) after the backoff, and the BE parameter value indicates an index for selecting a random backoff period, and more specifically, a numeral representing an amount of backoff periods the terminal waits for before the terminal attempts channel assignment and increasing by '1', to thereby increase as a binary exponential. For reference, the CSMA/CA algorithm may be an algorithm used as a method for allowing the terminal to access an uplink channel in the IEEE 802.15.4 standard or the IEEE 802.15.4e standard and may be mainly divided into a slotted CSMA/CA algorithm in which division is performed in each time slot unit and an unslotted CSMA/CA algorithm. The present invention mainly uses the slotted CSMA/CA algorithm but is not limited thereto.

Again describing the operation (S10) of setting the parameter values, for example, the NB parameter value may be set to be '0', the CW parameter value may be set to be '2', and the BE parameter value maybe set to be in a range having a preset maximum and minimum value.

Then, the channel access time may be set to be equal to a size of the CAP (S20). That is, in the operation (S20) of setting the channel access time, the time at which the terminal accesses the channel is set to be equal to the size of the CAP of a frame to thereby allow the terminal to randomly access the channel. Here, the size of the CAP may be varied by a size of a contention free period (CFP) according to the IEEE 802.15.4 standard, and nodes within the wireless network may recognize the size of the CAP through a beacon signal broadcasted by a coordinate node.

Next, access to a channel to be used is attempted according to the set channel access time (S30).

Therefore, an idle state of the accessed channel is confirmed (S40), when the accessed channel is in the idle state, the CW parameter value decreases by '1'. When the CW parameter value becomes '0', data to be transmitted may be transmitted to the accessed channel (S60).

However, when the accessed channel is in use, the NB, CW, and BE parameter values may be reset (S70). For example, the value of the NB parameter value may increase by '1', the CW parameter value may be set to be '2', similar to the above-mentioned case, and the BE parameter value may increase by '1'.

Thereafter, when the data to be transmitted is traffic having a preset high priority (S80), the channel access time is reset to be equal to the size of the CAP to thereby again attempt the channel access (S90), and when data to be transmitted is not traffic having a preset high priority, the channel access time is reset to $2^{BE}$ to thereby again attempt the channel access (S100). Here, the channel access is attempted according to whether the NB parameter value is larger than the maximum number of preset backoffs, and when the NB parameter value is larger than the maximum number of preset backoffs, it may be determined that the transmission has failed (S110).

An operation principle of the channel access method according to the embodiment of the present invention as described above will be described with reference to the accompanying drawing.

Figure 2:
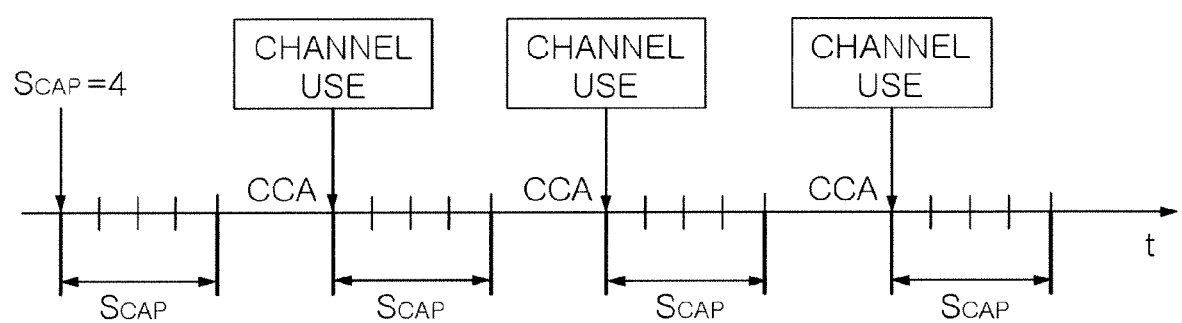
FIG. 2 is a view showing an operational principle of a channel access method according to an embodiment of the present invention.

FIG. 2 is a view showing an operational principle of a channel access method according to an embodiment of the present invention.

Referring to FIG. 2, in the channel access method according to the embodiment of the present invention, for example, in a case in which the channel access time ($S_{CAP}$) is set to be equal to a size of a CAP having a value of '4', when a channel to be accessed after the CCA is in use, access to a corresponding channel is attempted according to the set channel access time ($S_{CAP}$) to increase access frequency so as to access the channel for each super-frame, whereby more opportunities of accessing the channel may be more rapidly provided to a terminal having high priority traffic.

As set forth above, according to the embodiment of the present invention, the channel access opportunity is provided to high priority traffic for each super-frame in the wireless network, whereby high priority traffic may be preferentially transmitted.

While the present invention has been shown and described in connection with the exemplary embodiments, it will be apparent to those skilled in the art that modifications and variations can be made without departing from the spirit and scope of the invention as defined by the appended claims.

What is claimed is:

1. A channel access method in a wireless network, the channel access method comprising:
   setting parameter values required for channel access;
   setting a channel access time to be equal to a size of a contention access period (CAP); and
   accessing a channel to be used by resetting the channel access time to be equal to the size of the CAP when traffic to be transmitted is traffic having a preset high priority in a case in which the channel is not in an idle state.

2. The channel access method of claim 1, wherein the setting of the parameter values includes setting number backoff (NB), contention window length (CW), and backoff exponent (BE) parameter values.

3. The channel access method of claim 2, wherein the accessing of the channel includes:
   accessing the channel according to the set channel access time;
   resetting the NB, CW, and BE parameter values in a case in which the accessed channel is not in the idle state; and
   resetting the channel access time to be equal to the size of the CAP when the traffic to be transmitted is the traffic having a preset high priority.

4. The channel access method of claim 3, wherein the accessing of the channel further includes attempting access to the channel to be used by resetting the channel access time to be equal to the size of the CAP until the reset NB parameter value is the same as the maximum number of backoffs.

5. The channel access method of claim 3, further comprising decreasing the CW parameter value by '1' in the case in which the accessed channel is in the idle state and transmitting the traffic to a corresponding channel when the CW parameter value becomes '0'.

6. The channel access method of claim 3, wherein the accessing of the channel further includes resetting the channel access time to be equal to a size of $2^{BE}$ when the traffic to be transmitted is not the traffic having a preset high priority.

7. The channel access method of claim 6, wherein the accessing of the channel further includes attempting access to the channel to be used by resetting the channel access time to be equal to the size of $2^{BE}$ until the reset NB parameter value is the same as the maximum number of backoffs.

8. A channel access method in a wireless network, the channel access method comprising:
    setting number backoff (NB), contention window length (CW), and backoff exponent (BE) parameter values required for channel access;
    setting a channel access time to be equal to a size of a contention access period (CAP);
    accessing a channel according to the set channel access time;
    resetting the NB, CW, and BE parameter values in a case in which the accessed channel is not in an idle state;
    attempting access to a channel to be used by resetting the channel access time to be equal to the size of the CAP until the reset NB parameter value is the same as the maximum number of backoffs when traffic to be transmitted is traffic having high priority;
    decreasing the CW parameter value by '1' in a case in which the channel to be used is in the idle state and transmitting the traffic to a corresponding channel when the CW parameter value becomes '0';
    resetting the channel access time to a size of $2^{BE}$ when the traffic to be transmitted is not traffic having high priority; and
    attempting the access to the channel to be used by resetting the channel access time to be equal to the size of $2^{BE}$ until the reset NB parameter value is the same as the maximum number of backoffs.

* * * * *